May 7, 1963  C. M. RIVELY ETAL  3,088,572
TRANSFER CONVEYOR
Original Filed Jan. 15, 1959  10 Sheets-Sheet 1
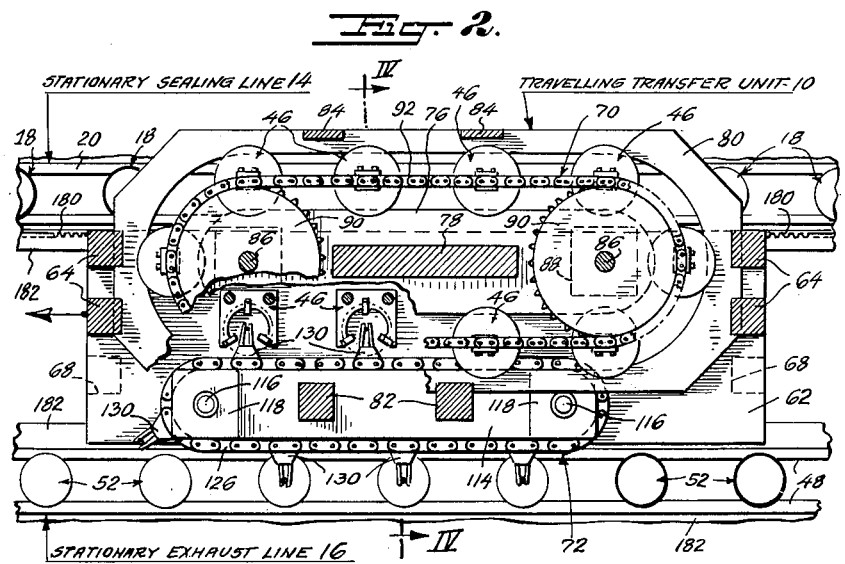
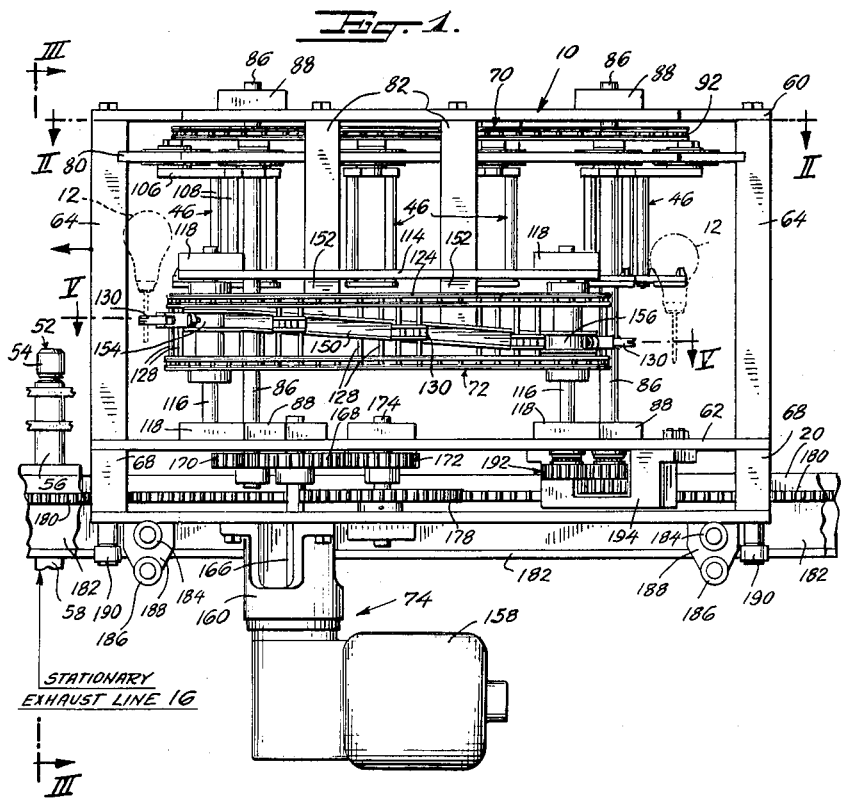

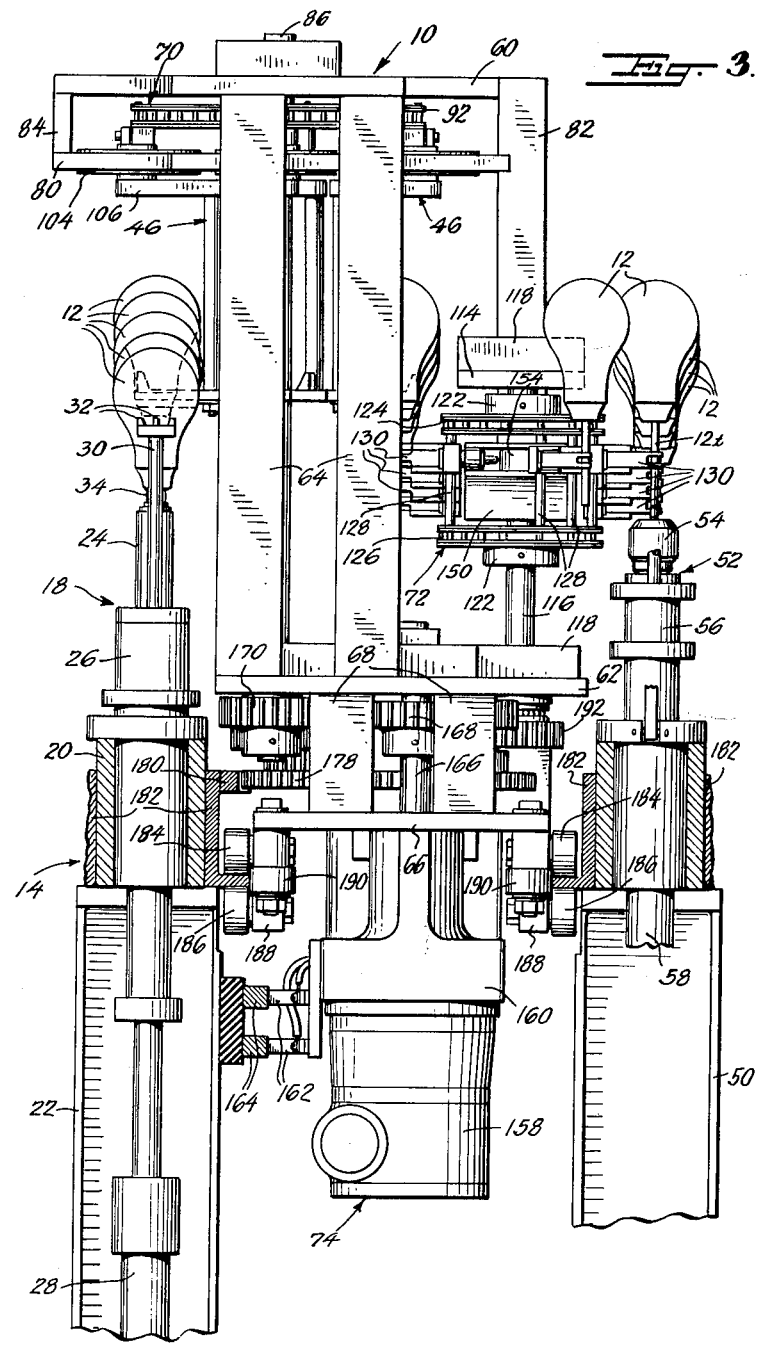

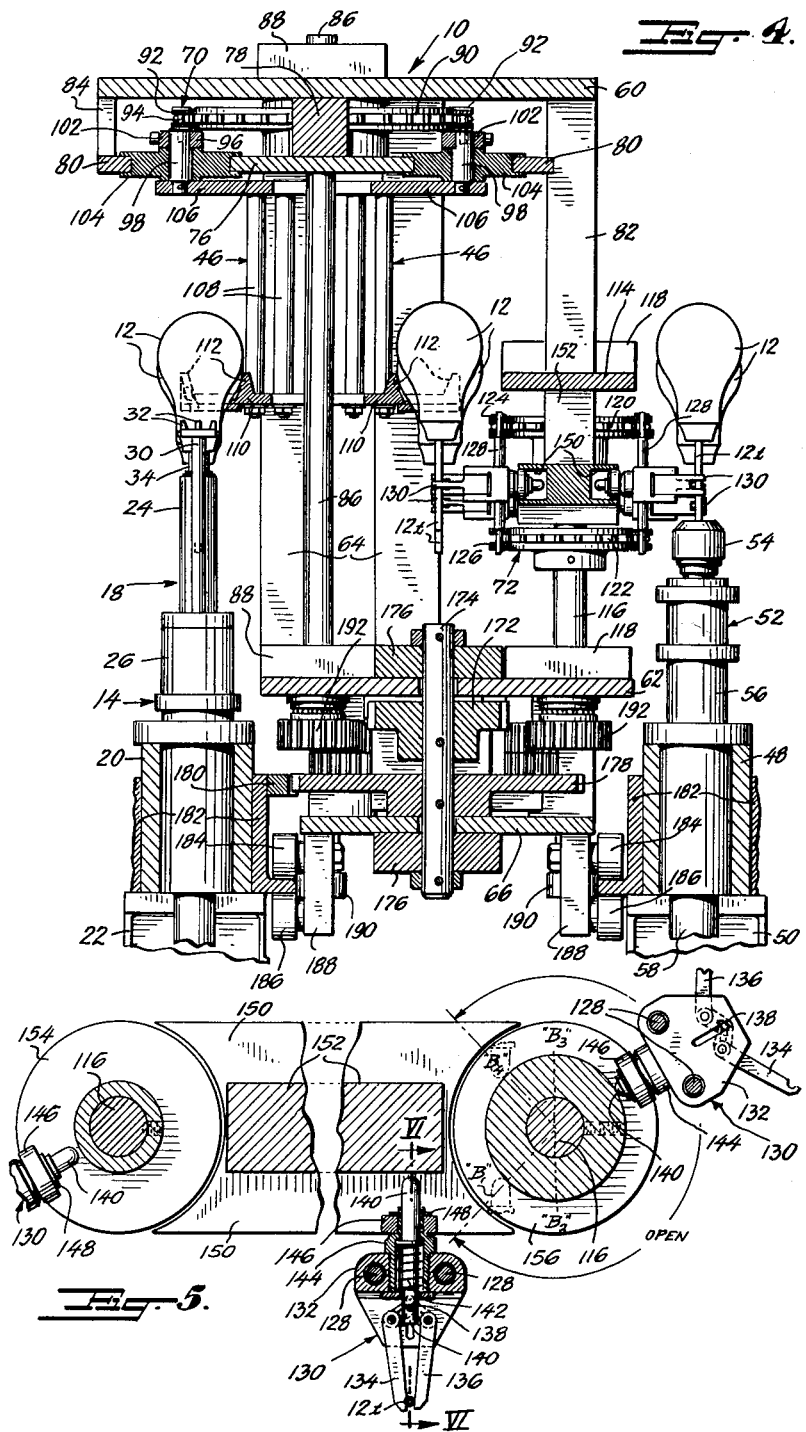

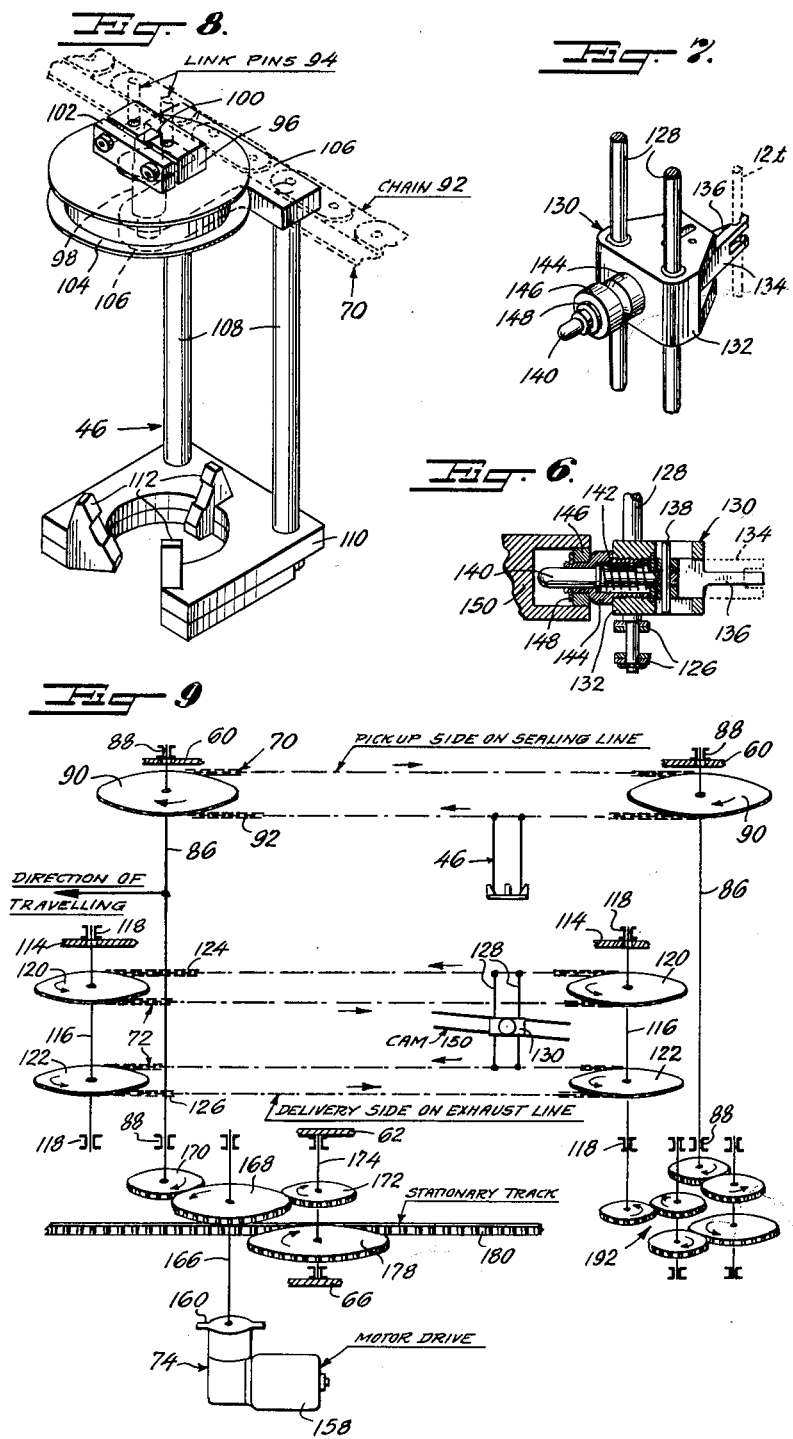

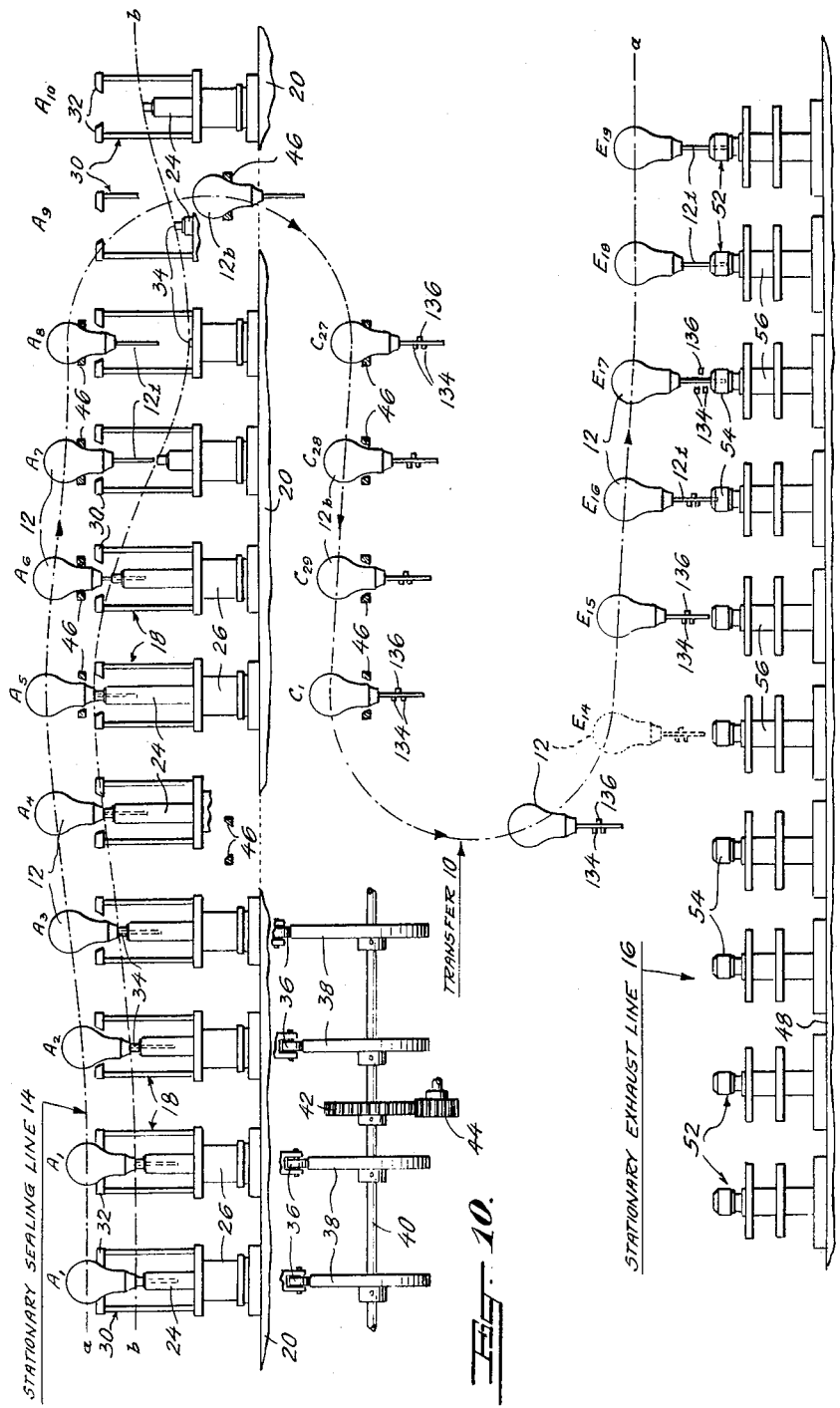

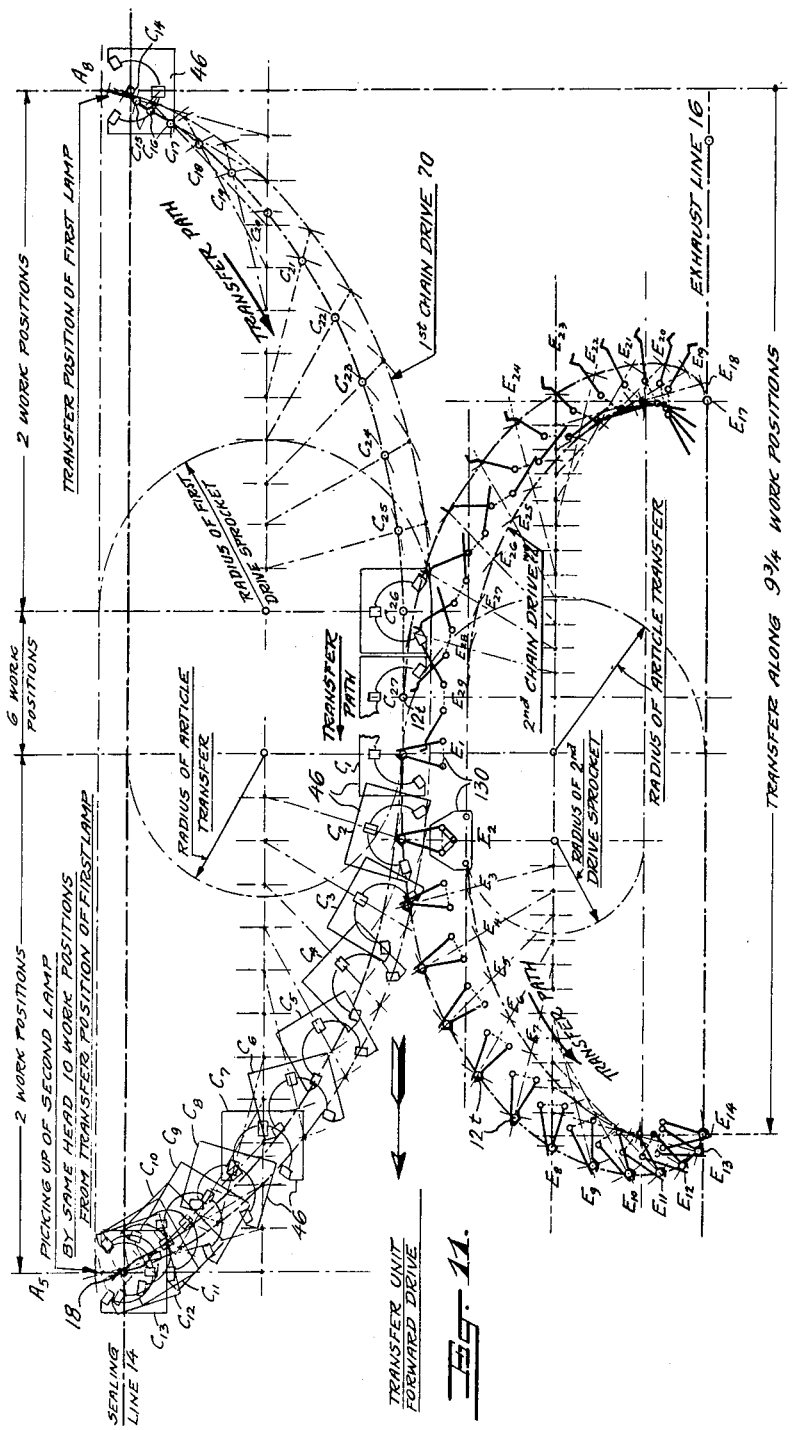

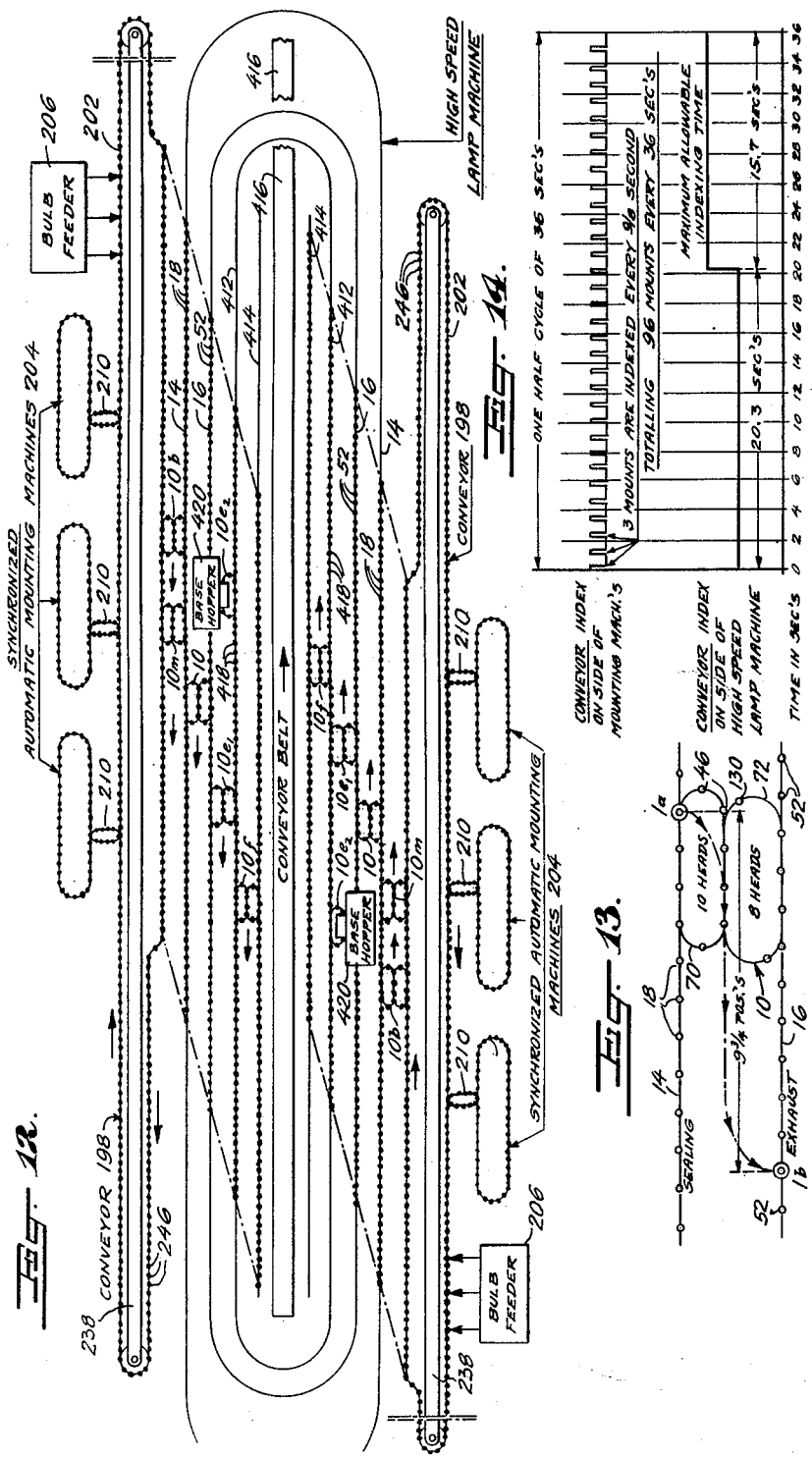

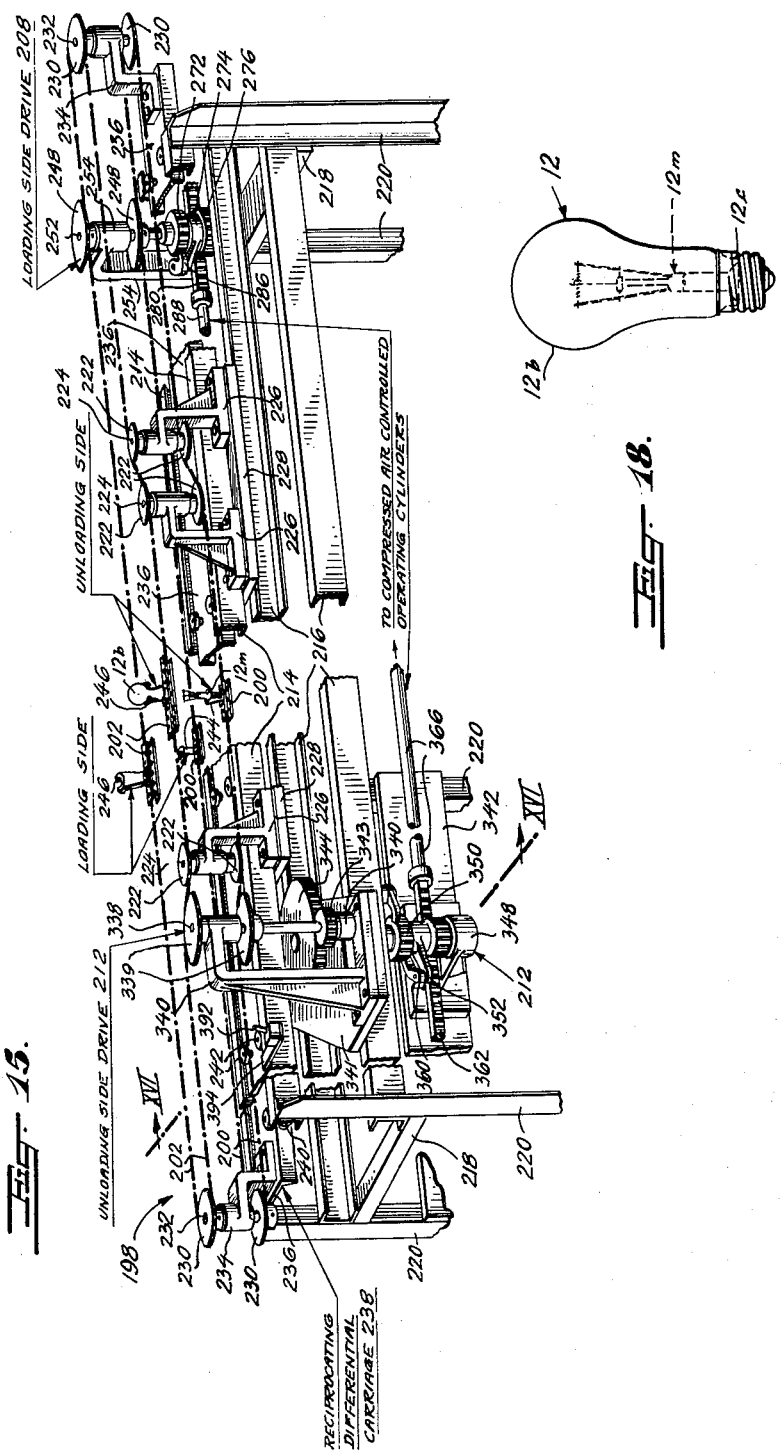

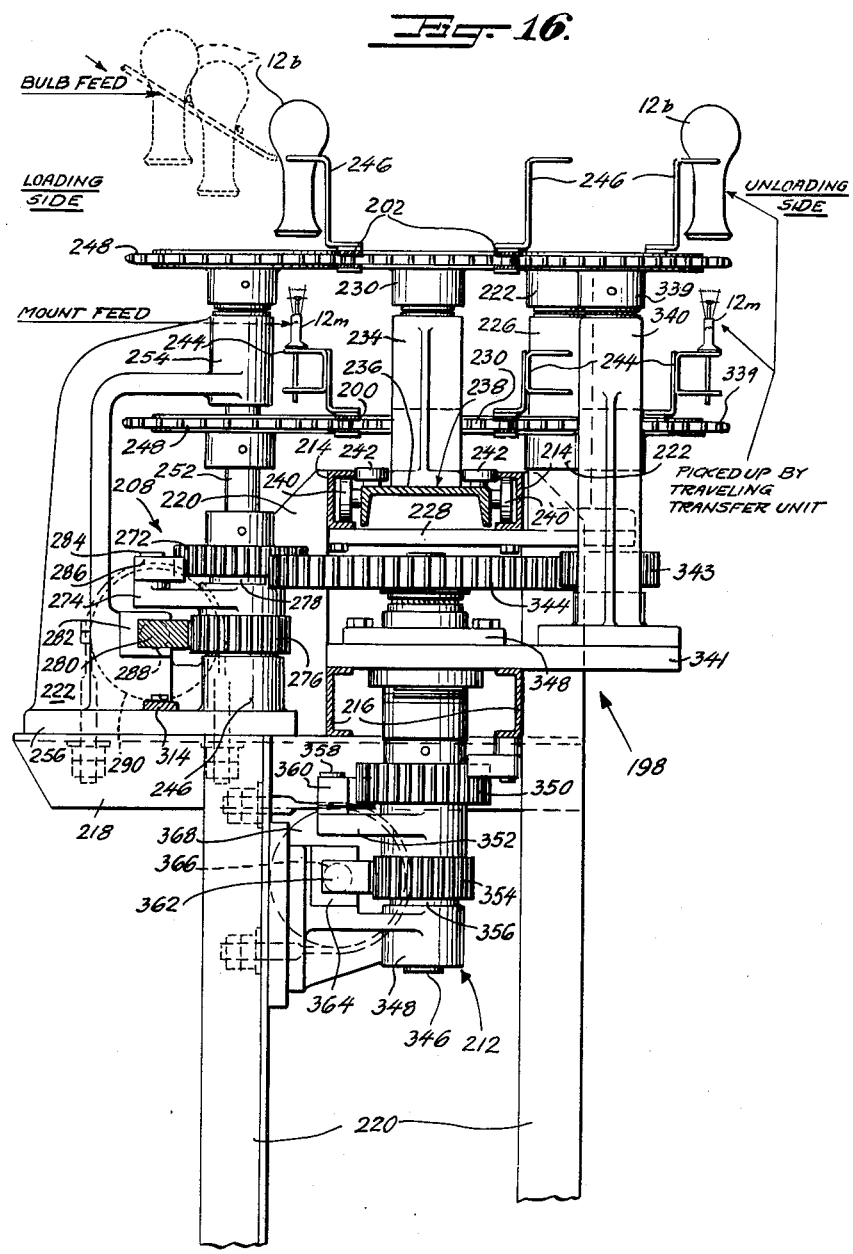

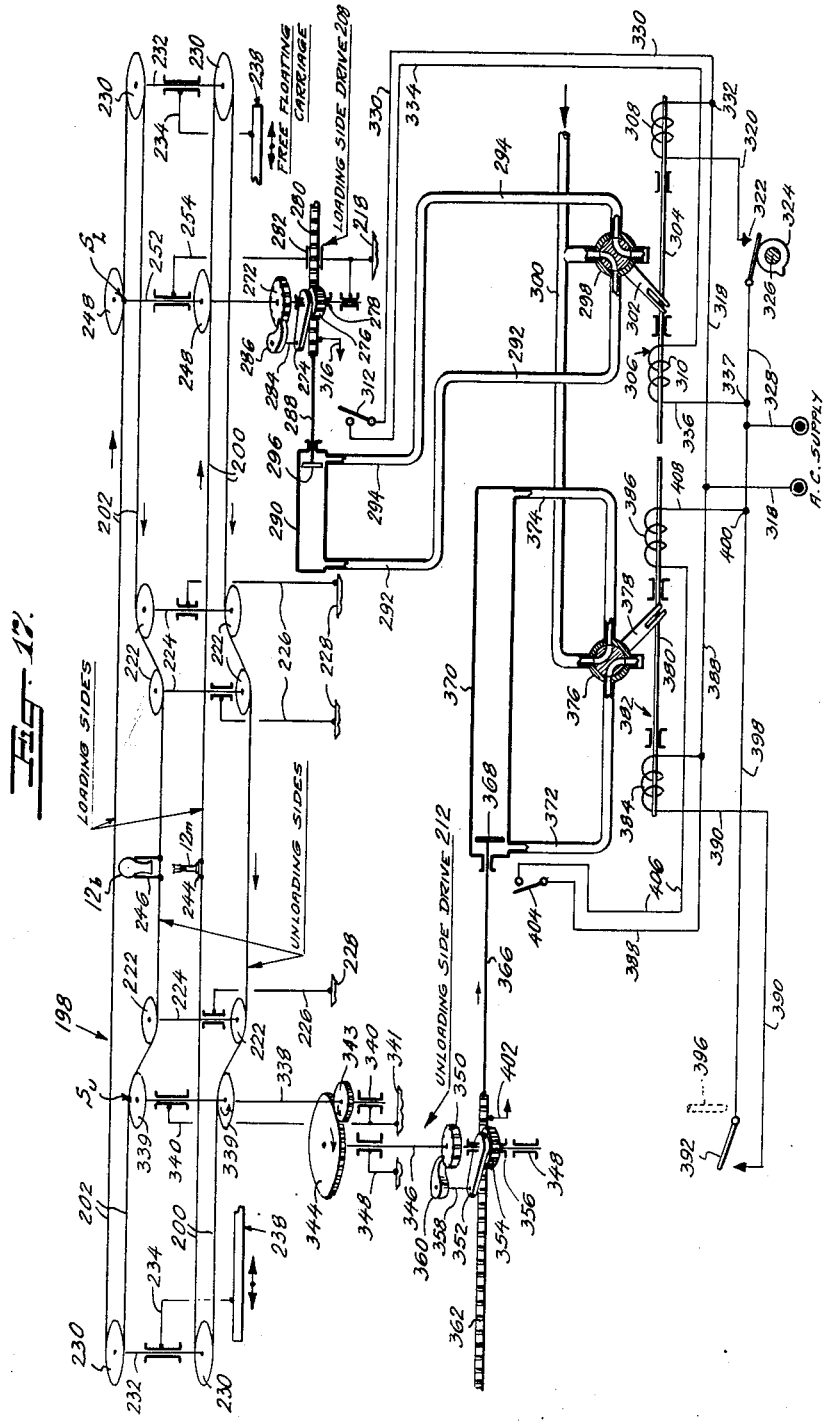

United States Patent Office 3,088,572
Patented May 7, 1963

3,088,572
TRANSFER CONVEYOR
Clair M. Rively, Rockaway, N.Y., and William A. Brenneck, West Caldwell, N.J., assignors to Westinghouse Electric Corporation, East Pittsburgh, Pa., a corporation of Pennsylvania
Application Apr. 6, 1961, Ser. No. 112,145, which is a division of application Ser. No. 787,059, Jan. 15, 1959. Divided and this application Apr. 6, 1961, Ser. No. 112,144
12 Claims. (Cl. 198—19)

The present invention relates to an automatic high-speed machine for manufacturing a product produced by the assembly of the individual parts and, more particularly, to such a machine for manufacturing incandescent lamps, discharge devices, electronic tubes and the like. This application is a divisional application of the patent application of Clair M. Rively et al., Serial No. 112,145 filed April 6, 1961 for "Article Transfer Apparatus," the said application 112,145 being itself a divisional application of application Serial No. 787,059 filed January 15, 1959 and entitled "Automatic Manufacturing Machine."

Heretofore incandescent lamps, discharge devices and electronic tubes have been manufactured by a group of conventional machines comprising generally a mounting machine, a sealing and exhausting machine and a basing machine, which group employs on the average about three operators and requires vast areas of floor space, such as about 600 sq. ft. These conventional machines transfer the work pieces or sub-assemblies from work station to work station either intermittently, as by indexing, or continuously. Further, when maintenance is required for a particular head of one of these machines, that machine must be shut-down, thus incapacitating the entire group during the maintenance period. In addition, conventional machines due to their rotating motion and their relatively large weight are limited by the factors of momentum and inertia to index speeds of 3000 to 3600 units per hour. Due to the stresses produced in these conventional machines during their operation and the limits of current engineering materials these production figures represent the maximum rates for a group of such machines. A further limitation in the case of the sealing and exhausting machines, is the use of a sliding rotary valve which limits the index time and hence the production rate to the minimum exhaust time required per head per exhaust station.

It is accordingly the general object of the present invention to avoid and overcome the foregoing and other difficulties of and objections to the prior art practices by the provision of apparatus for the high-speed manufacture of any product produced by the assembly of the individual parts and capable of production rates in the neighborhood of 18,000–22,000 units per hour.

A further object of the present invention is to provide an improved automatic high-speed manufacturing machine which is easily maintained without lengthy shut-down periods.

Another object of the present invention is to provide an improved automatic high-speed manufacturing machine which requires a minimum number of operators and considerably less floor space than heretofore required to produce an equivalent number of lamps.

An additional object of the present invention is to provide a transfer unit operable to transfer articles between a stationary or movable article-feeding zone and a stationary or movable article-receiving zone.

A further object of the present invention is to provide a work unit operable to perform a work function on articles on adjacent stationary or movable work lines.

A still further object of the present invention is to provide a transfer conveyor adapted to receive articles from an article-feeding unit operating at a predetermined rate of output and to present the articles in a stationary unloading zone for subsequent transfer to a stationary work line.

The aforesaid objects of this invention and other objects, which will become apparent as the description proceeds, are achieved by providing an automatic high-speed manufacturing machine which first produces a plurality of sub-assembly units at a predetermined rate. A transfer conveyor then receives these sub-assembly units and presents a first line of heads loaded with such sub-assembly units in a position where they are picked up by a transfer unit. This transfer unit automatically operates to transfer the sub-assembly units from the first line to a work line of article-assembling units where such sub-assembly units are added to or completed. If the articles require several progressive steps during their fabrication additional work lines are provided, as required, with a similar transfer unit employed between each adjacent pair of work lines to transfer the articles during their various stages of manufacture from one work line to another. Also work units adapted to perform short term work functions on the articles may be employed between adjacent work lines. After completion the articles are automatically removed from the last work line and packed ready for shipment.

For a better understanding of the invention reference should be had to the accompanying drawings wherein:

FIG. 1 is a side-elevational view of a compound transfer unit and a stationary lamp-exhaust line having a portion partially broken away to show the entire transfer unit.

FIG. 2 is a horizontal-sectional view of the transfer unit along the line II—II of FIG. 1 in the direction of the arrows and showing the associated stationary lamp-sealing and exhaust lines.

FIG. 3 is an enlarged end-elevational view of the transfer unit along the line III—III of FIG. 1 in the direction of the arrows and showing the associated stationary lamp-sealing line on the left, the stationary lamp-exhaust line on the right and the details of the drive mechanism for the transfer unit.

FIG. 4 is a vertical-sectional view of the transfer unit and associated stationary lamp-sealing line and lamp-exhaust line along the line IV—IV of FIG. 2 in the direction of the arrows and showing the drive mechanism for the pick-up conveyor and discharge conveyor, which form a part of the transfer unit, and their respective article-carrying heads.

FIG. 5 is an enlarged fragmentary horizontal-sectional view of the discharge conveyor of the transfer unit taken along the line V—V of FIG. 1 looking in the direction of the arrows and showing a discharge head in the closed position about ready to open for the discharge of an article and another discharge head in the open position after discharge.

FIG. 6 is a vertical-sectional view of a discharge head of the discharge conveyor taken along the line VI—VI of FIG. 5 looking in the direction of the arrows and showing the discharge head in the closed position, about ready to open, a portion of a cam track for the discharge head and the details of the discharge head.

FIG. 7 is a perspective view of a discharge head of the discharge conveyor of the transfer unit and its associated guide rods.

FIG. 8 is a perspective view of a pick-up head of the pick-up conveyor and a portion of the head-carrying movable member.

FIG. 9 is a diagrammatic perspective view of the drive mechanism for the transfer unit, the pick-up conveyor and the discharge conveyor and showing, for the sake of simplicity, only one pick-up head and one discharge head.

FIG. 10 is a diagrammatic operational view of the successive positions of an article, such as a lamp, during its transfer by the transfer unit from a stationary head on the lamp-sealing line to a stationary head on the lamp-exhaust line and showing the path of movement and vertical displacement of the lamp and a sealing spindle during the lamp transfer operation.

FIG. 11 is a diagrammatic plan view of the curtate-cycloid path of movement of a pick-up head from the transfer position of an article from a first sealing head into alignment with a discharge head to permit the transfer of an article to the discharge head while aligned therewith and its further curtate cycloid path of movement into alignment with a second sealing head; the prolate cycloid path of movement of a discharge head with the transferred article into alignment with an exhaust head to permit the transfer of the article to an exhaust head while aligned therewith and its similar path of movement into alignment with another pick-up head.

FIG. 12 is a diagrammatic plan view of the automatic high-speed lamp manufacturing machine employing the transfer units between successive stationary lines of operation and a transfer conveyor for transferring subassemblies, such as lamp mounts, from a plurality of automatic mounting machines and lamp bulbs from feeder devices, to two of the transfer units and showing the complete manufacturing operation from mounting to packing.

FIG. 13 is a diagrammatic plan view of the transfer of an article, such as a lamp, from a sealing head on the stationary sealing line to an exhaust head on the stationary exhaust line and showing the relative longitudinal displacement of the article during transfer.

FIG. 14 is a diagrammatic plan view of the intermittent operation of both sides of the transfer conveyor between the automatic mounting machines and bulb feeders and the transfer units.

FIG. 15 is a perspective view of the transfer conveyor which because of its length has been broken away along its mid-portions.

FIG. 16 is a vertical-sectional view of the transfer conveyor taken along the line XVI—XVI of FIG. 15 looking in the direction of the arrows, and showing the bulb conveyor, the mount conveyor and the associated drive mechanism therefor.

FIG. 17 is a diagrammatic perspective view of the drive mechanism for the transfer conveyor and showing the associated drive means and electrical circuits.

FIG. 18 is a side-elevational view of a finished lamp manufactured on the automatic high-speed manufacturing machine.

Although the principles of the invention are broadly applicable to the manufacture of any product which is produced by the assembly of the individual parts, the invention is particularly adapted to the manufacture of incandescent lamps and hence it has been so illustrated and will be so described.

With specific reference to the form of the invention illustrated in the drawings a compound transfer unit, generally indicated by the numeral 10 (FIGS. 1 to 13) has been shown which is operable to transfer articles, such as sealed lamps 12, from an article-feeding line, such as a stationary sealing line 14, to an article-receiving line, such as a stationary exhaust line 16, as said unit 10 moves therebetween from right to left, as viewed in FIG. 1.

SEALING LINE

To support a plurality of reciprocable heads 18 of the sealing line 14, for example ninety-six as shown in FIG. 12 a frame is provided which comprises a longitudinal channel 20 (FIG. 3) supported by legs 22, affixed to the bottom of the channel 20 at regular spaced intervals. As shown in FIG. 12, the tandem-type sealing line 14 may consist of two such longitudinal sealing portions of ninety-six heads 18 each spaced, for example, about six inches apart, which sealing portions are connected by rounded non-operating end portions.

In order to permit reciprocation of each of the heads 18 (FIGS. 3 and 4) a spindle 24 for each head 18 is reciprocable in an upper bearing 26 in the channel 20 and a lower bearing 28 upstanding from the floor. So that each head 18 may rotate, a bifurcated sealing-head bulb holder 30 (FIG. 10) is rotatably affixed to the upper portions of each of the upper bearings 26 and is provided with suitable fingers 32 adapted to support the bowl of a lamp 12. As is well known in the sealing art, each spindle 24 has a mount pin 34 (FIG. 3) on its upper end to position the flare of a lamp mount 12m (FIG. 18) during the sealing operation. To provide a reciprocating means for each spindle 24, the lower end of each spindle 24 carries a roller 36 (FIG. 10) for engagement with an individual cam 38 on a sealing-line cam shaft 40, which shaft 40 is driven by a gear 42 meshing with a pinion gear 44 affixed to the shaft of a motor (not shown).

During operation the cam 38 progressively raises the spindle 24 within a predetermined period of time so that, if the heads 18 were not in simultaneous horizontal motion (but remain horizontally stationary while the transfer unit 10 moves relative to the rising spindles 24, which is the case as hereinafter described) the effect of such progressive raising of the spindle 24 is that the end of the spindle 24 travels an imaginary path of movement, as indicated by the dotted line "$b$" in FIG. 10. By the the same token, since a sealed lamp 12 is cradled in the sealing-head holder 30, such lamp 12 is raised by the spindle 24 from the normal work position of the lamp in the holder 30, as shown at "$A_1$" in FIG. 10, progressively through positions "$A_2$" and "$A_5$," and thence through positions "$A_6$" to "$A_8$," which would be equivalent to such lamp traversing an imaginary path of movement "$a$" in FIG. 10, during the same period of time that the end of the spindle 24 moved through its imaginary path "$b$."

When, however, the lamp 12 is raised by the spindle 24 to the position "$A_5$," a pick-up head 46 carried by a conveyor of the transfer unit 10, as hereinafter more fully described, aligns itself with the sealing-head holder 30 and contacts the lamp 12 at the position "$A_6$" so that the latter is supported by the transfer unit pick-up head 46, since the spindle 24 alone moves downwardly from positions "$A_6$" to "$A_8$" leaving the lamp 12 in the pick-up head 46. Finally, due to the relative movement of the pick-up head 46 with respect to the lamp holder 30, and after the spindle 24 has cleared the lamp tubulation 12t by moving below the latter, as shown in position "$A_7$" (FIG. 10), the pick-up head 46 with the bulb 12b supported thereby moves away from its previous axial alignment with the sealing head bulb holder 30 and thus moves the lamp 12 through the opening in the bifurcated lamp holder 30. At the same time the spindle 24 moves upwardly through position "$A_9$" and "$A_{10}$" and returns to its initial work position "$A_1$," as indicated by the line "$b$" in FIG. 10.

To provide synchronized raising and lowering of successive spindles 24 both with respect to each other and the travel of the transfer unit 10, the raised portion of each cam 38 (FIG. 10) is offset a predetermined amount on the shaft 40 from the raised position of the preceding cam 38, as viewed in the direction of travel of the transfer unit 10.

Since the individual automatic tooling for sealing the mounts 12m (FIG. 18) to the bulbs 12b does not, per se, form a part of this invention it is sufficient to say that the bulbs 12b and flares of the mounts 12m are preheated, then heated to a semi-plastic condition to effect sealing thereof and finally the seals are molded to a desired contour for the later application of bases 12c, in the conventional manner.

EXHAUST LINE

The supporting structure for each longitudinal side of the tandem-type exhaust line 16 (FIGS. 1, 2, 3, 4, 10 and 12), similar in general structure to the sealing line 14, has a longitudinal channel 48 (FIG. 3) supported on a plurality of spaced legs 50 upstanding from the floor. A plurality of stationary exhaust heads 52, for example ninety-six in the showing of FIG. 12, are mounted on the channel 48 in the same spaced relation to each other as the sealing heads 18 on the sealing line 14, namely, about six inches apart. For the purpose of hermetically sealing a tubulation 12t in each head 52, a compression rubber assembly 54 of conventional structure, such as shown in U.S. Patent No. 2,254,905, issued September 2, 1941, to Daniel Mullan, is mounted on a hollow head housing 56 of each head 52 and the housing 56 is secured to the channel 48. So that a sealed lamp 12 may be alternately evacuated and gas filled during the exhaust thereof and exhaust and gas fill line 58 connects the hollow interior of the housing 56 with a conventional valve (not shown) for alternately connecting said line 58 to a vacuum system or to a gas fill system (both not shown).

Since the individual automatic exhaust tooling for each head 52 does not, per se, form a part of this invention it is sufficient to say that the sealed lamps 12 in the heads 52 are subjected to the conventional exhaust steps comprising baking, alternately flushing and exhausting, final gas fill and tip off.

TRANSFER UNIT

In order to provide a frame for the compound transfer unit 10 (FIGS. 1–12) of the present invention, a top rectangular table 60 and an intermediate rectangular table 62 are integrated at their end portions (FIGS. 1 and 2) by a plurality of, for example four, upright vertical columns 64, and a lower rectangular table 66 is fixed in spaced relationship to the intermediate table 62 by a plurality of, for example four, spacers 68.

A pick-up conveyor 70 and a discharge conveyor 72 of the compound transfer unit 10, as well as a drive mechanism 74 for the transfer unit 10 and the conveyors 70 and 72 are all operatively mounted on such frame of the transfer unit 10 as will now be more specifically described.

PICK-UP CONVEYOR

For the purpose of furnishing a supporting structure for the movable pick-up conveyor 70, which carries the pick-up heads 46 (FIGS. 1, 2, 3, 4, and 9), an inner guide 76 (FIG. 4) is suitably spaced below the top table 60 by a supporting spacer 78 depending from the table 60. An outer guide 80 is located in the same horizontal plane as the inner guide 76 (FIG. 4) and has its forward and rear end portions, as viewed in FIG. 2, mounted in suitable grooves in the columns 64. As shown in FIG. 4, the right-hand side portion of this outer guide 80, adjacent the exhaust line 16, is mounted in similar grooves in brackets 82 depending from the top table 60 while its other longitudinal side is supported by spacers 84 (FIGS. 2, 3 and 4) depending from top table 60. The guides 76 and 80 have, for convenience, the same general shape as the top table 60, with the latter guide 80 having angulated corners as shown in FIG. 2. In addition, the spacer 78 and the inner guide 76 are provided with a pair of clearance holes for vertical shafts 86 (FIGS. 1, 3 and 4) journalled in spaced relation in suitable bearings 88.

Each of the shafts 86 (FIG. 9) carries a guide member, such as a sprocket 90, and an endless movable member, such as a chain 92, passes around each sprocket 90 and is supported thereby. Such chain 92 carries the pick-up heads 46, which may be ten in number, as shown in FIGS. 2 and 13, with such heads 46 being adapted to pick up a sealed lamp 12 from a head 18 of the sealing line 14 as hereinbefore mentioned. To attach each of these pick-up heads 46 to the endless movable member 92, in the same spaced relation as the sealing heads 18, namely about six inches, a pair of link pins 94 (FIG. 8) in the chain 92 have their depending lower ends threadable into a block 96 on the pick-up head 46.

PICK-UP HEADS

In order to permit each pick-up head 46 on the pick-up conveyor 70 (FIGS. 1, 4 and 8) to ride on the guides 76 and 80, a roller pin 98 has its block-like upper end portion, as viewed in FIG. 8, secured in a suitable slot 100 in the block 96, by a plate 102 affixed to the block 96, and such roller pin 98 carries a lipped guide roller 104 (FIGS. 4 and 8) which rides on the guides 76 and 80. To retain the roller 104 on the shaft 98, a T-shaped bracket 106 is affixed to the lower end of the shaft 98, as by pinning. For the purpose of providing each head 46 with lamp-receiving means, a pair of mount rods 108 depend from the bracket 106 and support a bulb-holder plate 110, on their lower end portions, which holder 110 is adapted by means of fingers 112 to receive a sealed lamp 12 from a head 18 of the sealing line 14 in the pick-up position "$A_5$" (FIG. 10), as previously hereinmentioned.

DISCHARGE CONVEYOR

To afford mounting means for the discharge conveyor 72 of the transfer unit 10, a table 114 (FIGS. 1, 2, 3 and 4) is supported by the same bracket 82 depending from the top table 60 which also supports the guide member 80. This table 114 conveniently has a generally rectangular shape, as shown in FIG. 1. The movable portion of the discharge conveyor 72 has a pair of vertical shafts 116 (FIGS. 1–4 and 9) journalled in suitable bearings 118 mounted in the table 114 and intermediate table 62. Each shaft 116 carries an upper sprocket member 120 and a lower sprocket member 122 and endless movable members, such as chains 124 and 126, pass around these upper and lower sprocket members 120 and 122 respectively, and hence are movably supported thereby.

For the purpose of serving as guides for the mounting thereon of a plurality of vertically reciprocable discharge heads 130 (FIGS. 5, 6 and 7) of the discharge conveyor 72 in the same spaced relation as the pick-up heads 46, namely about six inches apart, common link pins 128 extend between the movable members. The heads 130 may be eight in number, as shown in FIGS. 2 and 13. It will be understood from a consideration of FIGS. 2 and 9 that contiguous parallel portions of the movable member 92 of the pick-up conveyor 70 and the movable members 124 and 126 of the discharge conveyor 72 move at the same rate and in the same direction, to permit the transfer of sealed lamps 12 from the pick-up heads 46 to the discharge heads 130.

DISCHARGE HEADS

The discharge heads 130 carried by the discharge conveyor 72 each comprise a body 132 (FIGS. 5, 6 and 7) reciprocably movable along its associated pair of link pins 128 which pass through such body. A slot is formed in the outer side of such body 132 (FIGS. 5–7) and a pair of jaws 134 and 136 are pivotably mounted in the body slot with the outer ends of such jaws being adapted to normally close and grip the exhaust tubulation 12t of a sealed lamp 12. The inner end of these jaws 134 and 136 are engageable by a pin 138 carried by the inner end of a reciprocable plunger 140 extending through the inner side wall of the body 132. In order to maintain the outer end of the plunger 140 in its normally extended position (FIGS. 6 and 7), which position in turn keeps the jaws 134 and 136 closed through engagement of the pin 138 with the inner ends of such jaws, a coil spring 142 surrounds the plunger 140 where it passes through a bushing 144 provided in the body 132 and the spring 142 forces the plunger 140 outwardly of the body 132, as shown in FIGS. 5 and 7.

By reference to these latter figures, it will be noted that the means for raising and lowering each head 130 on the link pins 128 utilizes a roller 146 which surrounds the normally protruding end of the plunger 140 and is secured to the body 132 in any suitable manner, such as by a snap-ring 148. Such roller 146 of each discharge head 130 rides in a pair of cam tracks 150 supported by suitable brackets 152 depending from the table 114 (FIG. 1). These cam tracks 150 parallel the horizontal path of movement of the endless movable members 124 and 126 of the discharge conveyor 72 on each side of the axis of the shafts 116, but as can be seen from FIG. 1, such cam tracks 150 decline downwardly on each side of the axis of the shafts 116 from the upper endless member 124 toward the lower endless member 126. Hence, each discharge head 130 is at its highest elevation along the link pins 128 when at the upper left-hand end of the cam tracks 150, as viewed in FIGS. 1 and 5, being so raised or lowered by the roller 146 as it travels along the cam tracks 150 on each side of the axis of the left-hand shaft 116.

After the discharge head 130 reaches the top of the link pins 128, its integral roller 146 is then carried, by the endless movable members 124 and 126, from the far cam track 150 (as viewed in FIG. 1) into engagement with a grooved idler cam 154 (FIG. 5) affixed to the adjacent shaft 116. The roller 146 of each head 130 rides in the groove of this idler cam 154 during counterclockwise rotary movement (FIGS. 1 and 5) of the discharge head 130 about the common axis of the cam 154 and shaft 116 until such roller 146 again engages the highest elevation of the near cam track 150 (as viewed in FIG. 1). It will be noted particularly from FIG. 5, that the depth of the groove in the idler cam 154 is such that the discharge head plunger 140 is slightly spaced from the cam hub so that such plunger is in no way moved and hence the discharge head jaws 134 and 136 continue to remain closed about the tubulation 12t of a lamp 12 during the entire counterclockwise rotation (FIG. 5) of the discharge heads 130 about the periphery of the idler cam 154 and the axis of its drive shaft 116.

When the roller 146 of each discharge head 130 is carried by the continued movement of the discharge conveyor 72 into engagement with the highest elevation of the near cam track 150, as viewed in FIG. 1, such roller 146 rides down the declining surface thereof to insert the tubulation 12t into the exhaust head 52. At its lower elevation of the roller 146 passes from the cam track 150 into the groove of another rotary cam 156 carried by the other shaft 116 of the discharge conveyor 72 and utilized to open the jaws 134 and 136. By reference now more particularly to FIG. 5, it will be noted that the inner hub portion of such rotary cam 156 is of much greater diameter than the hub portion of the idler cam 154. As the roller 146 traverses the periphery of this rotary cam 156, the end of the discharge head plunger 140 contacts such enlarged hub portion at the position "$B_1$" in FIG. 5, causing the beginning of an inward movement of such plunger 140 against the tension of the inner coil spring 142. When the plunger end reaches the position "$B_2$" of FIG. 5, it will be at the point of largest diameter of the hub portion of the rotary cam 156 and hence will then be entirely depressed into the discharge head 130, thus causing complete opening of the head jaws 134 and 136 which thus release the tubulation 12t of the lamp 12, leaving the latter in the exhaust head 52 into which it was deposited by the downward movement of the discharge head 130.

The head jaws 134 and 136 continue to remain open, as the empty discharge head 130 rotates counterclockwise (FIG. 5) about the periphery of the rotary cam 156 and the axis of its drive shaft 116, until the end of plunger 140 reaches point "$B_3$" in FIG. 5 where outward movement of the plunger 140 begins and is completed at position "$B_4$," at which time the head jaws 134 and 136 will have again closed about the tubulation 12t of another lamp 12 carried by the pick-up head 46 of the pick-up conveyor 70. As the pick-up heads 46 of the pick-up conveyor 70 and the discharge heads 130 of the discharge conveyor 72 move together at the same speed and in the same direction along a common path of movement (FIGS. 11 and 13), the elevating cam track 150 paralleling their path of movement and which is engaged by the head roller 146 raises the discharge head 130, as before mentioned, thus causing the latter to lift the lamp 12, by means of its tabulation 12t which is grasped by the head jaws 134 and 136, out of the pick-up head 46.

DRIVE MECHANISM

The prime mover for the drive mechanism 74 for the transfer unit 10 comprises an electric motor 158 supported on brackets 160 depending from the bottom table 66. As shown in FIG. 3, this motor 158 is energized from a suitable source of electrical energy to which it is connected by brushes 162 and bus bars 164 extending along the path of movement of the transfer unit 10. In order to utilize the motor 158 to cause movement of the transfer unit 10 between the sealing line 14 and the exhaust line 16, a drive shaft 166 of the motor 158 (FIGS. 3 and 9) extends through the bottom table 66 of the transfer unit 10 and carries a drive gear 168 meshing with a pinion gear 172 on an upright short shaft 174 journalled in suitable bearings 176 on the transfer unit 10 (FIG. 1). Such shaft 174 also carries a drive gear 178 engaging a stationary rack 180 affixed to a left-hand L-shaped guide track 182 (FIGS. 3 and 4) on the channel 20 of the sealing line 14, above the bus bars 164. A similar right-hand guide track 182 (FIG. 3) is also affixed to the channel 48 of the exhaust line 16 in horizontal alignment therewith.

To carry the weight of the transfer unit 10 and to keep it aligned with its path of movement, a pair of vertical rollers 184 and 186 are mounted on brackets 188 (FIG. 4) depending from each of the four corners of the bottom table 64. These pairs of rollers 184 and 186 engage the top and bottom surface, respectively, of the guide tracks 182 and eliminate vertical movement of the transfer unit 10. In order to prevent lateral movement of the transfer unit 10, a horizontal roller 190 (FIGS. 3 and 4), mounted adjacent each pair of rollers 184 and 186, engages the inner face of its respective guide track 182. For the purpose of employing the motor 158 to also drive the pick-up conveyor 70 and the discharge conveyor 72, a pinion gear 170 on the forward shaft 86 (with reference to direction of movement, FIG. 1, of the pick-up conveyor 70) meshes with the drive gear 168. The clockwise rotation (FIG. 9) imparted to the forward shaft 86 by the drive gear 168 is transmitted by the guide sprockets 90 and movable endless member 92 to the rearward shaft 86 which in turn is connected by a gear train 192 to the rearward shaft 116, as viewed in FIG. 9, of the discharge conveyor 72. Such gear train 192 is contained in a gear box 194 (FIG. 1) affixed to the bottom of the intermediate table 62 of the transfer unit 10 and such gear train 92 is selected so that the adjacent sections of the movable endless member 92 of the pick-up conveyor 70 and the similar members 124 and 126 of the discharge conveyor 72 travel at the same rate and in the same direction, as hereinbefore mentioned.

OPERATION OF DRIVE MECHANISM

Upon energization of electric motor 158, the drive gear 168 is rotated in a counterclockwise direction which thereby rotates (FIG. 9) the gear 178 on the short shaft 174 in clockwise direction. Since this gear 178 engages the stationary rack 180, as previously mentioned, the transfer unit 10 moves to the left (FIGS. 1 and 2) along the guide tracks 182 between the stationary sealing line 14 and stationary exhaust line 16. At the same time counterclockwise rotation of the drive gear 168 rotates the pinion gear 170 on the forward shaft 86 (FIG. 1) of the pick-up conveyor 72 so that the sprocket members 90 and the rearward shaft 86 are in turn rotated in clockwise direction (FIG. 9). Such rotation of the rearward shaft 86 causes the above mentioned gear train 192 to rotate a pinion gear 196 on the rearward shaft 116 and the sprocket members 120 and 122 carried thereby in counterclockwise direction (FIG. 9).

It will thus be seen from FIGS. 2 and 9, that the side of the pick-up conveyor movable member 92 adjacent the sealing line 14, and the sides of the discharge conveyor movable members 124 and 126 adjacent the exhaust line 16, simultaneously move in a direction opposite to the path of movement of the transfer unit 10 but at the same speed. This results in the pick-up heads 46 on the side of the pick-up conveyor 70 adjacent the sealing line 14, and the discharge heads 130 on the side of the discharge conveyor 72 adjacent the exhaust line 16, being in alignment with and relatively stationary with respect to the heads 18 on the sealing line 14 and the heads 52 of the exhaust line 16, respectively, to permit the transfer of lamps 12 therebetween. It should likewise be apparent that the pick-up heads 46 on the side of the movable member 92 of the pick-up conveyor 70 adjacent the discharge heads 130 on the movable members 124 and 126 of the discharge conveyor 72 align with each other and move in the same direction as the path of movement of the transfer unit 10 but at twice the speed of the heads 46 and 130 on the other side of the axes of their respective drive shafts 86 and 116, thus permitting the transfer of the lamps 12 (FIG. 10) from the pick-up heads 46 to the discharge heads 130 during the period in which the heads 46 and 130 are in alignment with each other.

OPERATION OF THE TRANSFER UNIT

By reference particularly to FIGS. 3 and 4, it will be apparent that the vertical axis of each pick-up head 46 of the pick-up conveyor 70 is radially located on the sprocket member 90 at a distance from the shaft 86 which is less than the radius of said sprocket member 90. Thus, as the transfer unit 10 moves to the left (FIG. 1) between the sealing line 14 and the exhaust line 16 and the sprocket member 90 rotates in clockwise direction (FIG. 2), the vertical axis of each pick-up head 46 follows the path of a curtate cycloid (FIG. 11). This curtate-cycloidal path of movement of the pick-up head 46 extends from a starting position "$C_1$," wherein the discharge head 130 of the discharge conveyor 72 is in alignment with the pick-up head 46, and through successive positions "$C_2$," "$C_3$" . . . to the last position "$C_{13}$," where the pick up head 46 is then aligned with a head 18 of the sealing line 14 at position "$A_5$" (FIG. 10). As hereinbefore explained, the pick-up head 46 and sealing head 18 remain in alignment during the lowering of both the sealing spindle 24 and the sealed lamp 12 at positions "$A_6$" through "$A_8$" (FIG. 10) to permit the reception of the lamp 12 in the fingers 112 of the bulb holder 110 and thereafter allow the withdrawal of the pick-up head 46 carrying the lamp 12 from alignment with the sealing head 18 beginning at position "$C_{14}$" (FIG. 11) and which corresponds to the position "$A_8$" of FIG. 10. The pick-up head 46 again follows the path of the curtate cycloid through the successive position "$C_{15}$," "$C_{16}$" . . . "$C_{26}$," shown in FIG. 11, until the head 46 becomes aligned at position "$C_{27}$" (FIG. 11) with a discharge head 130 of the discharge conveyor 72, at which position the tubulation-gripping jaws 134 and 136 of the discharge head 130 close about the tubulation 12t of the lamp 12, seated in the head 46.

The pick-up heads 46 and discharge heads 130 remain in alignment, as shown in FIG. 10, through the positions "$C_{27}$," "$C_{28}$," "$C_{29}$" and "$C_1$." During this path of joint movement, the elevating cam track 150 (FIG. 1) raises the discharge head 130 to lift the lamp 12 out of the pick-up head 46 by the time said heads arrive at position "$C_1$." To permit the pick-up head 46 to begin its curtate cylcoid motion and move away from the lamp 12 carried by the discharge head 130 while such head 130 continues its longitudinal motion, thus preventing breakage of the tubulation 12t of the lamp 12 by the head 46, it will be noted particularly from FIG. 13, that the discharge conveyor 72 on the transfer unit 10 leads the pick-up conveyor 70 by about ¼ of the distance of the spacing between the heads 46 and 130.

The sealed lamp 12 is then carried in the discharge head 130 around the grooved idler cam 154 in its elevated position until the head 130 and the lamp 12 arrive on the other side of the endless movable members 124 and 126 of the discharge conveyor 72 and are aligned (FIG. 10) with the compression-rubber assembly 54 of a head 52 on the exhaust line 16.

It will be understood from a consideration of FIGS. 2, 5, 6 and 7 that the vertical axis of each discharge head 130 during its path of movement around the idler cam 154, lies on an extension of a radius of the sprocket members 120 and 122 of the discharge conveyor 72 and will follow a path of a prolate cycloid through the successive positions $E_1$, $E_2$ . . . $E_{13}$, shown in FIG. 11, to the aligned position $E_{14}$, of FIGS. 10 and 11, with the compression-rubber assembly 54 on the exhaust head 52 as above mentioned. The discharge head 130, lamp 12 and the exhaust head 52 remain in alignment, as shown in FIG. 10, through the positions $E_{15}$, $E_{16}$, and $E_{17}$. During their alignment the cam track 150 lowers the head 130 and inserts the tubulation 12t of the lamp 12 in the compression-rubber assembly 54, so that when the discharge head 130 reaches the lowermost position $E_{17}$ of FIGS. 10 and 11, the tubulation 12t is fully inserted into the compression-rubber assembly 54. As shown particularly in FIG. 5, the plunger 140 of the discharge head 130 then engages the jaw-opening grooved cam 156 at position $B_1$ thus releasing the tubulation 12t of the lamp 12 from the discharge head 130, and permitting such head 130 with its jaws 134 and 136 now open, to move around the cam 156 along the path of a prolate cycloid through the positions $B_2$, $B_3$, $B_4$ (FIG. 5) and corresponding to positions $E_{18}$ through $E_{29}$ (FIG. 11). At position $B_4$ ($E_{29}$) the jaws 134 and 136 close about a tubulation 12t of another lamp 12 held in a second pick-up head 46 in the position $C_{27}$ (FIG. 11), and the transfer cycle is repeated.

Owing to the ¼ position offset, shown in FIG. 13, between the conveyors 70 and 72, a lamp 12 picked up from a sealing head 18 at position 1a by the transfer unit 10, and transferred to an exhaust head 52 at position 1b on the exhaust line 16, is moved longitudinally to the left, as viewed in FIG. 13, 10—¼ or 9¾ positions.

Since stationary lines of work stations are employed by the automatic manufacturing machine of the present invention and are shown (FIG. 12), it has been found advantageous to employ a transfer conveyor 198 (FIGS. 12, 14 and 15 through 17) having a pair of movable members 200 and 202, such as endless chains, for receiving sub-assemblies, such as lamp mounts 12m and bulbs 12b, from a plurality of indexing article-fabricating machines, such as automatic mounting machines 204 of the type shown in U.S. Patent No. 2,637,144, issued May 5, 1953, to R. M. Gardner et al. and a bulb feeder 206 of the type shown in U.S. Patent No. 1,783,806, issued December 2, 1930 to W. W. Loebe et al. respectively. These movable members 200 and 202 then present the mounts 12m and bulbs 12b respectively in a stationary line for transfer by a mount-transfer unit 10m and a bulb-transfer 10b respectively to a stationary work line, such as the sealing line 14. The loading side of the movable members 200 and 202 is moved three stations to the right, as viewed in FIG. 12, by a first drive means, such as the loading side drive 208, at a first index station $S_L$ (FIG. 17) at a first rate of index namely 3200 times each hour or once every ⅔ seconds (FIG. 14). This first rate of index is in synchronism with the rate of output of the bulb feeder 206, the automatic mount machines 204 and associated transfer devices 210 which transfer the lamp mounts 12m from the automatic mounting machines 204 to the movable member 200 at a plurality of stations on the loading side. The unloading side of the movable members 200 and 202 is moved ninety-six stations to the left, when viewed in FIG. 12 by a second drive means, such as the unloading side drive 212, (FIG. 17) at a second index station $S_U$ at a slower rate of index, namely one hundred times each hour or once every thirty-six seconds (FIG. 14), than the rate of index of the automatic mounting machines. Due to the greater rate of index of the automatic mounting machines 204, the portion of the movable members 200 and 202 moving from the first index station $S_L$ to the second index station $S_U$ gradually increases in length and the remaining portion gradually decreases in length.

TRANSFER CONVEYOR

To provide a frame for the transfer conveyor 198 of the present invention (FIGS. 12, 14 and 15 through 17), a pair of upper longitudinal channels 214 and a pair of lower longitudinal channels 216 are secured to horizontal tie members 218 and legs 220.

For the purpose of supporting the unloading side of the movable members 200 and 202 in their path of movement from the first index station $S_L$ to the second index station $S_U$ and back again to the former station, a plurality of guide members 222, suitably sprockets, are fixed to shafts 224 rotatable in suitable bearings 226 upstanding from a plurality of mounting plates 228 disposed on the bottom surface of the upper channels 214. To support the loading side of the movable members 200 and 202, guide members 230, also sprockets, are mounted on shafts 232 rotatable in bearings 234 disposed in spaced relation on a longitudinal channel member 236 of a reciprocating carriage 238. It will be apparent from FIGS. 12, 15 and 17 that the innermost guide members 222 on the unloading side are spaced farther from the longitudinal axis of the reciprocating carriage 238 than the remaining guide members 222, with such off-set of these innermost guide members 222 providing an unobstructed path of movement or unloading zone for the mount-transfer unit 10m and the bulb-transfer unit 10b (FIG. 12) as said transfer units leave the curved portions of the sealing line 14 and align themselves parallel to the sealing line 14.

So that the carriage 238 may be moved to the right, as viewed in FIGS. 12, 15 and 17, by the portion of the movable members 200 and 202 between the second index station $S_U$ and the first index station $S_L$ to compensate for the difference in the rate of movement of the loading and unloading sides of the movable members, the longitudinal member 236 of the carriage 238 is mounted on the upper channels 214 by means of a plurality of opposed pairs of vertical rollers 240, and a plurality of pairs of horizontal rollers 242. These rollers engage the channels 214 at positions along the length of the longitudinal member 236 and also prevent motion of the carriage 238 in a vertical plane and in a plane transverse to the longitudinal axis of its reciprocatory movement.

To adapt the movable member 200 to receive lamp mounts 12m from the transfer devices 210, a plurality of mount-receiving heads 244 (FIG. 16), for example three hundred eight, as shown in FIG. 12, are disposed thereon the same distance apart as the sealing heads 18 of the sealing line 14. In like manner, the movable member 202 is provided with a similarly spaced number of bulb-receiving heads 246.

For the purpose of supporting the first drive means for the loading side of the transfer conveyor 198, drive members 248, both suitably sprockets, are affixed to a shaft 252 journalled in a bearing 254 upstanding from a support plate 256 secured to one of the tie members 218.

FIRST DRIVE MEANS FOR LOADING SIDE OF TRANSFER CONVEYOR

The aforesaid shaft 252 of the first drive means 208 also carries a keyed ratchet wheel 272, as well as a pawl arm 274 and a rack pinion gear 276 joined together by a bushing 278 (FIG. 17) which is rotatable on the shaft 252. The pinion gear 276 engages a rack 280 slidable in a guide 282 provided in the lower portions, as viewed in FIGS. 16 and 17, of the bracket for the bearing 254 carrying the shaft 252. The free end of the pawl arm 274 carries a stud shaft 284 on which is mounted a pwl 286 engageable with the ratchet wheel 272 to cause counterclockwise rotation (FIG. 17) of such ratchet wheel 272 and the attendant indexing of the loading side of the movable members 200 and 202 a desired number of, for example three stations to the right, as viewed in FIG. 17, upon rotation of the shaft 252.

To provide a prime mover for the first drive means 208 for the loading side of the movable members 200 and 202, the left-hand end of the rack 280, as viewed in FIG. 17, is affixed to an operating rod 288 of an air cylinder 290. The air cylinder 290 is provided with two inlet lines 292 and 294 for passage of air thereinto. Admission of air through line 292 causes respective movement of the piston rod 296 to the left with attendant counterclockwise rotation of pinion gear 276 and shaft 252, as viewed in FIG. 17, and resultant indexing of the movable members 200 and 202 three index positions to the right. Admitting the air through line 292 causes the piston rod 296 to return to its initial position in the cylinder 290, as shown in FIG. 17. The lines 292 and 294 are connected by means of a four-way valve 298 to an air line 300 extending from a high-pressure air supply (not shown).

In order to operate the valve 298, an operating rod 302 of the valve 298 has its normally free end connected to a reciprocating armature 304 of a solenoid 306. This solenoid 306 has one armature coil 308 connected to an "indexing" circuit and its other coil 310 included in a "resetting" circuit. The resetting coil 310 is energized upon closure of a normally open switch 312, mounted on an extension 314 of the support plate 256 (FIG. 16) when the switch 312 is contacted by an arm 316 carried by the rack 280, upon movement of the latter to the left (FIG. 17).

As shown particularly in FIG. 17 the "indexing" circuit for the loading side of the transfer conveyor 198 extends from one side of a voltage supply, indicated by the legend "A.C. Supply," through a conductor 318 leading to one end of the coil 308 of the solenoid 306 and from the other end of the coil 308 through a conductor 320, to one side of a normally open switch 322 closable at a predetermined time by a cam 324 on a cam shaft 326 of one of the automatic mounting machines 204. This "indexing" circuit is then completed from the other side of the switch 322 by a conductor 328 to the other side of the voltage supply.

Thus, after the three automatic mounting machines 204 (FIG. 12) have each delivered a mount 12m to a mount-receiving head 244 on the loading side of the movable member 200 of the transfer conveyor 198 and the bulb feeder 206 (FIG. 12) has delivered a bulb 12b to three bulb-receiving heads 246, the cam 324 on the shaft 326 of one of the automatic mounting machines, closes the switch 322 thus energizing the indexing coil 308 of the solenoid 306, which energization causes the moving of the armature 304 in a counterclockwise direction, as viewed in FIG. 17. This arm rotation causes the passage of high-pressure air from the line 300 through the valve 298 and the line 294, thus moving the piston rod 296 of the air cylinder 290 to the left. In turn, this movement of the piston rod 296 causes the operating rod 288 and the rack 280 to likewise move to the left, as viewed in FIG. 17, and the pinion gear 276 and the ratchet wheel 272 to move in a counterclockwise direction thus indexing the loading side of the movable members 200 and 202 three positions to the right (FIG. 17) as above mentioned.

When the rack 280 reaches the end of its travel to the left, the switch operating arm 316 carried thereby closes the normally-open switch 312 which in turn closes the "resetting" circuit for causing the first drive means 208 for the loading side of the conveyor 198 to return to its initial position shown in FIG. 17.

This "resetting" circuit (FIG. 17) includes a conductor 330 extending from a junction point 332 with the conductor 318 (which effectively constitutes one side of the supply source) to one side of the normally open switch 312 and extends from the other side of the switch 312 by a conductor 334 to one end of the resetting coil 310 of the solenoid 306 and thence by means of a suitable conductor 336 from the other side of the coil 310 to the junction point 337 with the line conductor 328, which constitutes the other side of the supply source.

Closure of the switch 312 (by rack arm 316, as above mentioned) causes closure of this "resetting" circuit, thus energizing the resetting coil 310 of the solenoid 306 accompanied by movement of the solenoid armature 304 to the left (FIG. 17) with attendant rotation of the valve 294 in a clockwise direction. This valve rotation permits the flow of high pressure air from the line 300 through the valve 298 and the line 292 and causes the movement of the piston rod 296 in the air cylinder 290 to the right, to its initial position, as shown in FIG. 17. The resultant movement of the operating rod 288 attached to the piston rod 296 and the rack 280 in the same direction, rotates the gear 276 in a clockwise direction. However, since the gear 276 is free to rotate on the shaft 252 and the pawl 286 does not drive the ratchet wheel 296 during such rotation, the movable members 200 and 202 do not index.

SECOND DRIVE MEANS FOR THE UNLOADING OF THE TRANSFER CONVEYOR

In order to mount the second drive means for the unloading side of the transfer conveyor 198, a shaft 338 which carries drive members 339, suitably sprockets, is journalled in bearings 340 affixed to a support plate 341 projecting from the lower channels 216 and a lower plate 342 (FIG. 15). This shaft 338 also carries a gear 343 which meshes with a larger gear 344 on a shaft 346 journalled in suitable bearings 348 (FIG. 16). For the purpose of causing rotation of the shaft 346, a ratchet wheel 350 is keyed thereon and a pawl arm 352 and a rack gear 354 are connected together by, a bushing 356 (FIG. 17) rotatable on the shaft 346. The pawl arm 352 carries a stud shaft 358 (FIG. 17) which is mounted on a pawl 360 in engagement with the ratchet wheel 350. As in the case of the first drive means 208 for the loading side of the movable members 200 and 202 of the transfer conveyor 198, the rack gear 354 engages a rack 362 slidable in a suitable guide 364 provided in a bracket of lower bearing 348 which bracket is attached to the plate 342 (FIG. 16) on the frame of the transfer conveyor 198. The right-hand end, as viewed in FIG. 17, of the rack 362 is attached to one end of an operating rod 366 projecting from a piston rod 368 of an air cylinder 370. This air cylinder 370 is provided with two high-pressure air supply lines 372 and 374 at its left and right hand ends respectively, as viewed in FIG. 17, which ends are connected by means of a four-way valve 376 to the aforementioned air supply line 300.

For the purpose of operating the valve 376, an operating arm 378 is pivotably connected to an armature 380 of a solenoid 382 whose indexing coil 384 and resetting coil 386 are in a second "indexing" circuit and a second "resetting" circuit respectively.

This second "indexing" circuit (FIG. 17) extends from the line conductor 318 through a conductor 388 leading to one end of the indexing coil 384 of the solenoid 382 and from the other end of such indexing coil 384 by a conductor 390 to one side of a normally-open switch 392, mounted on a plate 394 attached to the front upper channel 214 (FIG. 15) on the left-hand end of the unloading side of the transfer conveyor 198. The switch 392 is utilized for actuating the second drive means 212 for the unloading side and is operable by an arm 396, shown in dotted lines in FIG. 17, which arm 396 is carried by the frame portions of the bulb-transfer unit 10b (FIG. 12). Such second "indexing" circuit is then completed by a conductor 398 extending from the other side of the switch 392 to a junction point 400 with the line conductor 328.

Thus, when the arm 396 (FIG. 17) on the transfer unit 10b closes the normally-open switch 392 this second "indexing" circuit is closed, thus energizing the indexing coil 384 of the solenoid 382 and causing the movement of the solenoid armature 380 to the left, as viewed in FIG. 17. This movement of the armature 380 rotates the operating arm 378 and the valve 376 clockwise to permit the passage of high-pressure air from the supply line 300 through the valve 376 and the line 372, thus causing the movement to the right (FIG. 17) of the operating piston rod 368 of the air cylinder 370 together with the operating rod 366 and the rack 362 attached thereto. Such movement of the rack 362 rotates the rack gear 354 and the ratchet wheel 350 and the gear 344 on the shaft 346 in the clockwise direction, as viewed in FIG. 17. Due to the length of the cylinder 370 and the gear ratio of the second drive means 212, this clockwise rotation of the gear 344 rotates the meshing gear 343 and drive members 339 on the shaft 338 in a counterclockwise direction, resulting in the attendant movement of the unloading side of the movable members 200 and 202 of the transfer conveyor 198 to the left, as viewed in FIGS. 12 and 17, for a total of ninety-six index positions, and presenting a full compliment of loaded mount-receiving heads 244 and bulb-receiving heads 246 to the unloading zone adjacent the path of movement of the transfer units 10m and 10b. Simultaneously, the indexing of the unloading side of the movable members 200 and 202 these ninety-six positions to the left, also causes the reciprocating carriage 238 to likewise move to the left (FIG. 15) to compensate for the movement of the movable members to the above-noted ninety-six positions.

Near the end of this indexing movement of the rack 362, an arm 402 carried on the forward end, as viewed in FIG. 17, of the rack 362 engages a normally-open switch 404 affixed to the air cylinder 370. This switch 404 controls closure of the second "resetting" circuit for returning hte second drive means 212 for the unloading side to its starting position. This "resetting" circuit extends from the line conductor 318 (FIG. 17) through the conductor 388 to one side of the switch 404 and from the other side of the switch 404 by means of a conductor 406 to one end of the resetting coil 386 of the solenoid 382. This circuit is then completed by a suitable conductor 408 extending from the other end of the coil 386 to the junction 400 with the conductor 398 which is connected to the line conductor 328.

Closure of the switch 404 by the arm 402 closes the second "resetting" circuit, thus causing energization of the coil 386 of the solenoid 382 with attendant movement of the solenoid armature 380 to the right, as viewed in FIG. 17. Such movement rotates the operating arm 378 of the valve 376 in counterclockwise direction to the position shown in FIG. 17, permitting the flow of high-pressure air from the line 300 through the valve 376 and the line 374 into cylinder 370 to cause the movement of the operating piston rod 368 to the left, as viewed in FIG. 17, thus resulting in the return of the second drive means 212 for the unloading side of the movable members 200 and 202 of the transfer conveyor 198 to the starting position. As in the case of the first drive means 208 for the loading side of such movable members 200 and 202, the pawl 360 does not effect any movement of the ratchet wheel 350 or the unloading side of the movable members during this return movement of such second drive means 212.

OPERATION OF TRANSFER CONVEYOR

As shown in FIG. 12, the second and third transfer devices 210 associated with the automatic mounting machines 204, numbered from left to right, deliver their mounts 12m to mount-receiving heads 244 which are twenty-five and fifty-one stations to the right respectively, from the head 244 to which the first transfer device 210 delivered its mount 12m. This disposition of the transfer devices 210 assures the feeding of a mount 12m (FIG. 18) to each mount-receiving head 244 on the loading side of the transfer conveyor 198. The bulb feeder 206 is located with respect to the bulb-receiving heads 246 to simultaneously feed a bulb 12b to each of three bulb-receiving heads 246 spaced four stations apart on the upper movable member 202 of the transfer conveyor 198, so that when the heads 246 on the upper movable member 202 have completely passed the bulb feeder 206, each head 246 will be loaded with a bulb 12b.

Since each of the automatic mount machines 204 (FIG. 12) is capable of producing 3200 mounts per hour and the bulb feeder 206 is capable of delivering 9600 bulbs per hour, the transfer devices 202 and bulb feeder 204 respectively deliver three mounts 12m and bulbs 12b every $$\frac{3600}{3200} = \frac{9}{8}$$

seconds (FIG. 14), or ninety-six mounts 12m and bulbs 12b every 36 seconds, to the loading side of the transfer conveyor 198. Further every $$\frac{9}{8}$$

seconds the first drive means 208 for the loading side will index the loading side of the movable members 200 and 202 three stations to the right, as viewed in FIG. 12. While the unloading side of the transfer conveyor 198 is maintained stationary, each three-station index of the loading side to the right, as viewed in FIGS. 12, 15 and 17 causes the carriage 238 to move ½ of this distance to the right on the upper channels 214 to compensate for the difference in the rate of indexing movement between the two sides of the movable members 200 and 202.

After the mount-transfer unit 10m and bulb-transfer unit 10b transfer the mounts 12m and 12b from the heads 244 and 246 respectively to the sealing heads 18 on the stationary line 14, the second drive means 212 for the unloading side of the transfer conveyor 198 is then actuated by closure of the switch 392 by the arm 396 on the transfer unit 10b, as previously mentioned, and ninety-six loaded heads 244 and 246 are indexed into the unloading zone between the inner guide members 222, as viewed in FIGS. 12 and 17. During the indexing of the unloading side of the transfer conveyor 198 the carriage 238 moves to the left, as viewed in FIGS. 12, 15 and 17 to again compensate for the differences in the rate of indexing movement between the two sides of the movable members 200 and 202.

JOINT OPERATION OF THE TRANSFER CONVEYOR AND TRANSFER UNITS

It will be understood from a consideration of FIG. 12 that the automatic high-speed machine of the present invention is of the tandem type, provided with duplicate tooling on each side of the longitudinal axis of said machine and while only the operation on one side may have been described in detail, the operation on the other side of the longitudinal axis is identical.

After the transfer conveyor 198 has delivered ninety-six loaded mount-receiving heads 244 and ninety-six loaded bulb-receiving heads 246 to the unloading zone on the unloading side of the transfer conveyor 198 and while such unloading side in then maintained stationary, the mount-transfer unit 10m and bulb-transfer unit 10b move, as hereinbefore stated, between the stationary lines of heads 244 and 246 of the transfer conveyor 198 and the stationary line of sealing heads 18, from the right to the left, as viewed in FIG. 12, (referring to the portion of the machine above the longitudinal axis) to effect the desired transfer of the parts.

Every time a lamp mount 12m or a bulb 12b is transferred by means of the transfer units 10b and 10m the transferred article advances 9¾ stations to the left, as viewed in FIGS. 12 and 13, from the pick-up point, position 1a (FIG. 13) on the article-feeding line to the discharge point, position 1b, on the article-receiving line. Each side of the tandem-sealing line 14 has ninety-six work positions, ten empty positions for this transfer off-set and four empty positions at the beginning and end of the operating line to permit the transfer units 10b etc. to present themselves in a longitudinal straight position between the work lines. Since there are four transfer operations in the examples shown in FIG. 12, each side of the tandem work lines has 96+4×10+8 or 144 stations. The total length of the longitudinal operating portion of the sealing line is only $$144 \times \frac{6''}{12}$$

or 72 ft.

Assuming that the speed of the transfer units 10m and 10b, is 4.72 stations or 2.36' per second, the total time required for the transfer units to transverse one of the longitudinal operating portions of the sealing line is $$\frac{144}{4.72}$$

or 30.5 seconds. Allowing 5.5 seconds to negotiate the curved portions of the sealing line 14, this gives a total of 36 seconds for a given transfer unit to complete its work cycle. Because there are forty-eight empty positions on the sealing line 14, the transfer unit will travel $$\frac{48}{4.72}$$

or 10.2 seconds through empty positions on each of the longitudinal sides of the sealing line 14. This 10.2 seconds plus 5.5 seconds for negotiating the curved portion of the machine provides 15.7 seconds (FIG. 14) for the transfer conveyor 198 to present ninety-six loaded heads 244 and 246 to the unloading zone, adjacent the path of movement of the transfer units 10m and 10b. If the transfer conveyor 198 travels at a rate of 3.5 ft. per sec., the conveyor will negotiate the $$96 \times \frac{6''}{12}$$

or 48 ft. in 13.7 seconds, which time is ample to accomplish the indexing of the unloading side of the transfer conveyor 198 before the other pair of transfer units 10m and 10b present themselves to the now loaded unloading zone of the transfer conveyor 198.

Thus, from the above description it is apparent that when the arm 396 on the transfer unit 10b closes the switch 392 on the frame of the transfer conveyor 198 (FIG. 15) to complete the second "indexing" circuit, a supply of ninety-six mounts 12m and bulbs 12b will have accumulated on the loading side of the transfer conveyor 198 and there is sufficient time, namely, 15.7 seconds, (FIG. 14) for the second drive means 212 for the unloading side of the transfer conveyor 198 to index a full compliment of ninety-six mounts 12m and bulbs 12b into the unloading zone on the unloading size of said transfer conveyor 198 for transfer thereof to the sealing line 14 by the other pair of transfer units 10m and 10b.

AUTOMATIC HIGH-SPEED MANUFACTURING MACHINE

The tandem-type automatic high-speed machine of the present invention (FIG. 12) comprises on each side thereof, as hereinbefore mentioned, the three automatic mounting machines 204 and associated mount-transfer devices 210, the bulb feeder 206, the transfer conveyor 198, the mount transfer unit 10m and bulb transfer unit 10b, and the stationary sealing line 14 and exhaust line 16. In addition to these, such automatic high-speed machine also includes a plurality of, for example, two additional similar work lines, namely a basing line 412 and a seasoning and testing line 414 and a packing conveyor 416.

It will be understood from a consideration of FIG. 12 that a transfer unit 10 (FIGS. 1–4) is employed between the sealing line and the exhaust line 16 to transfer the sealed lamps 12 therebetween. To transfer the exhausted lamps 12 from the exhaust heads 52 on the stationary exhaust line 16 to basing heads 418 on the stationary basing line 412 a similar transfer unit $10e_1$, is employed between the stationary lines 16 and 412. This transfer unit $10e_1$, is desirably provided with a means for inverting the exhausted lamps 12 during transfer, such as shown in FIGS. 33 and 34 of application 787,059 of which this application is a division. For the purpose of supplying bases 12c (FIG. 18) to the inverted exhausted lamps 12 held in the basing heads 418, a base-feeding device (of the type shown in U.S. Patent No. 2,137,173, issued November 15, 1938, to J. J. Malloy) is positioned adjacent the stationary exhaust line 16 to feed the bases 12c to a second transfer device $10e_2$ for transfer for such bases to the inverted exhausted lamps 12 in the heads 418. To accomplish the transfer of the based lamps 12 from the basing line 412 to the seasoning and testing line 414 a transfer unit 10f is utilized.

As shown in FIG. 12, the distances between units 10m and 10b etc. while such units are traversing the longitudinal portions of the high-speed automatic machine (shown in the upper portion of such figure) are fixed by operating the units at the same controlled linear speed. While the units are traversing a curved end portion of the machine (such as the left-hand portion), the speeds of such units are varied so that the units will arrive at the opposite longitudinal straight portions (shown in the lower portion of FIG. 12) with the same identical fixed distances between units.

Thus, it will be seen from the above description of the operation of the automatic high-speed manufacturing machine that 6×3200 or 19,200 mounts 12m per hour are produced by the six automatic mounting machines 204 and 19,200 mounts 12m and bulbs 12b (FIG. 18) are delivered by the transfer devices 210 and bulb feeders 206 respectively to the transfer conveyors 198. Further, the unloading sides of the two transfer conveyors 198 will deliver 2×96 or 192 mounts 12m and bulbs 12b per every 36 seconds or $$\frac{192 \times 3600}{36}$$

or 19,200 mounts 12m and bulbs 12b per hour to the pair of sealing lines 14. In the same manner the two exhaust lines 16, basing lines 412, seasoning and testing lines 414 will also cooperate to deliver 19,200 fabricated lamps 12 per hour to the packing conveyor.

Although a specific embodiment and alternative embodiments of the present invention have been herein shown and described, it will be understood that other modifications thereof may be made without departing from the scope of the present invention.

We claim:

1. A transfer conveyor for transferring articles from an article-producing zone to an article-discharge zone, comprising a reciprocable carriage, means supported by said carriage and movable with respect thereto and adapted to receive articles from said article-producing zone, means for moving one portion of said carriage-supported means at a substantially uniform rate to permit the latter to receive articles from said article-producing zone, advancing means for causing movement of a second portion of said carriage-supported means to present a line of articles to said discharge zone, said advancing means being operable to maintain said second portion stationary for a predetermined period of time to permit complete unloading of articles from said line of such articles in said discharge zone, and said carriage being movable by said carriage-supported means while said second portion is advanced and while said second portion is stationary to compensate for the different rate of movement between the two portions of said carriage-supported means.

2. A transfer conveyor for transferring articles from an article-producing zone to an article-discharge zone, comprising a reciprocable carriage, means supported by said carriage and movable with respect thereto and adapted to receive articles from said article-producing zone, means for moving one portion of said carriage-supported means at a substantially uniform rate to permit the latter to receive articles from said article-producing zone, advancing means for causing movement of a second portion of said carriage-supported means to present a line of articles, said advancing means being operable to maintain said second portion stationary for a predetermined period of time to permit complete unloading of articles from said line of such articles in said discharge zone, said carriage being movable by said carriage-supported means while said second portion is advanced and while said second portion is stationary to compensate for the different rate of movement between the two portions of said carriage-supported means and a control mechanism associated with said advancing means and operable at a predetermined time to cause energization of said advancing means.

3. A transfer conveyor for transferring first articles and second articles from an article-feeding zone to a discharge zone, comprising a reciprocable carriage, a first pair of guide members disposed on said carriage in spaced relation, a first endless member passing around and supported by said guide members and movable with respect thereto, a plurality of first article-supporting means on said first endless member and adapted to receive such first articles from said article-feeding zone, a second pair of guide members disposed on said carriage in spaced relation, a second endless member passing around and supported by said second pair of guide members and movable at the same rate as said first endless member, a plurality of second article-supporting means on said second endless member and adapted to receive such second articles from said article-feeding zone, means for moving one portion of said first and second endless members at a substantially uniform rate to permit said first article-supporting means to receive such first articles from said article-feeding zone and said second article-supporting means to receive such second articles from said article-feeding zone, advancing means for causing movement of a second portion of said first and second endless members to present a pair of lines of such first and second articles for transfer to said discharge zone, said advancing means being operable to maintain said second portion stationary for a predetermined period of time to permit complete unloading of such first and second articles from said lines of such articles, and said carriage being movable by said first and second endless members while said second portion is advanced and while said second portion is stationary to compensate for the different rate of movement between the two portions of said first and second endless member.

4. A transfer conveyor for transferring mounts and bulbs from an article-feeding zone to a discharge zone, comprising a recriprocable carriage, a first pair of sprockets disposed on said carriage in spaced relation, a first chain passing around and supported by said first sprockets and movable with respect thereto, a plurality of mount-supporting heads on said first chain and adapted to receive such mounts from said article-feeding zone, a second pair of sprockets disposed on said carriage in spaced relation, a second chain passing around and supported by said second pair of sprockets and movable at the same rate as said first chain, a plurality of bulb-supporting heads on said second chain and adapted to receive such bulbs from said article-feeding zone, means for moving one portion of said first and second chains at a substantially uniform rate to permit said mount-supporting means to receive such mounts from said article-feeding zone and said bulb-supporting means to receive such bulbs from said article-feeding zone, advancing means for causing movement of a second portion of said first and second chains to present a pair of lines of such mounts and bulbs to said discharge zone, said advancing means being operable to maintain said second portion stationary for a predetermined period of time to permit complete unloading of such mounts and bulbs from said lines, and said carriage being movable by said first and second chains while said second portion is advanced and while said second portion is stationary to compensate for the different rate of movement between the two portions of said first and second chains.

5. A transfer conveyor for transferring articles from an article-producing zone to a discharge zone comprising a reciprocable carriage, a pair of guide members disposed on said carriage in spaced relation, an endless member passing around and supported by said guide members and movable with respect to said carriage, a plurality of article-supporting means on said endless member adapted to receive articles from said article-producing zone, means for moving one portion of said endless member at a substantially uniform rate to permit the article-supporting means to receive articles from said article-producing zone, advancing means for causing movement of a second portion of said endless member to present a line of loaded article-supporting means to said discharge zone, said advancing means being operable to maintain said second portion stationary for a predetermined period of time to permit complete unloading of articles from said line of article-supporting means, and said carriage being movable by said endless member while said second portion is advanced and while said second portion is stationary to compensate for the different rate of movement between the two portions of said endless member.

6. A transfer conveyor for transferring first articles and second articles from an article-feeding zone to a discharge zone comprising a reciprocable carriage, a first means supported by said carriage and movable with respect thereto and adapted to receive such first articles from said article-feeding zone, a second means supported by said carriage and movable at the same rate as said first carriage-supported means and adapted to receive such second articles from said article-feeding zone, means for moving one portion of said first and second carriage-supported means at a substantially uniform rate to permit the first carriage-supported means to receive such first articles from said article-feeding zone and the second carriage-supported means to receive such second articles from said article-feeding zone, advancing means for causing movement of a second portion of said first and second carriage-supported means to present a pair of lines of such first and second articles to said discharge zone, said advancing means being operable to maintain said second portion stationary for a predetermined period of time to permit complete unloading of such first and second articles from said lines of such articles, and said carriage being movable by said first and second carriage-supported means while said second portion is advanced and while said second portion is stationary to compensate for the different rate of movement between the two portions of said first and second carriage-supported means.

7. A transfer conveyor for transferring first articles and second articles from an article-feeding zone to a discharge zone, comprising a reciprocable carriage, a first pair of guide members disposed on said carriage in spaced relation, a first endless member passing around and supported by said guide members and movable with respect thereto, a plurality of first article-supporting means on said first endless member and adapted to receive such first articles from said article-feeding zone, a second pair of guide members disposed on said carriage in spaced relation, a second endless member passing around and supported by said second pair of guide members and movable at the same rate as said first endless member, a plurality of second article-supporting means on said second endless member and adapted to receive such second articles from said article-feeding zone, means for moving one portion of said first and second members at a substantially uniform rate to permit the first article-supporting means to receive such first articles from said article-feeding zone and the second article-supporting means to receive such second articles from said article-feeding zone, advancing means for causing movement of a second portion of said first and second endless members to present a pair of lines of such first and second articles to said discharge zone, said advancing means being operable to maintain said second portion stationary for a predetermined period of time to permit complete unloading of such first and second articles from said lines of such articles, said carriage being movable by said first and second endless members while said second portion is advanced and while said second portion is stationary to compensate for the different rate of movement between the two portions of said first and second endless members, and a control mechanism associated with said advancing means and operable at a predetermined time to cause energization of said advancing means.

8. Conveyor apparatus for transferring articles from an article-producing zone to an article-discharge zone, comprising a reciprocable carriage, means supported by said carriage and movable with respect thereto and adapted to receive articles from said article-producing zone, means for moving one portion of said carriage-supported means into said producing zone to permit the latter to receive articles from said article-producing zone, advancing means for causing movement of a second portion of said carriage-supported means to present a line of articles to said discharge zone, said advancing means being operable to maintain said line stationary for a predetermined period of time, a movable transfer unit having conveyor means movable relative to said unit so that said conveyor means is stationary during a part of its path, said conveyor means while in the stationary part of its path cooperating with said line to unload said articles from said line in said discharge zone during said period of time, said carriage being movable by said carriage-supported means while said second portion is advanced and while said second portion is stationary to compensate for the different rate of movement between the two portions of said carriage supported means.

9. Conveyor apparatus for transferring first articles and second articles from an article-feeding zone to a discharge zone, comprising a reciprocable carriage, a first pair of guide members disposed on said carriage in spaced relation, a first endless member passing around and supported by said guide members and movable with respect thereto, a plurality of first article-supporting means on said first endless member and adapted to receive such first articles from said articles-feeding zone, a second pair of guide members disposed on said carriage in spaced relation, a second endless member passing around and supported by said second pair of guide members and movable at the same rate as said first endless member, a plurality of second article-supporting means on said second endless member and adapted to receive such second articles from said article-feeding zone, means for moving one portion of said first and second endless members into said article-feeding zone to permit said first article-supporting means to receive such first articles from said article-feeding zone and said second article-supporting means to receive such second articles from said article-feeding zone, advancing means for causing movement of a second portion of said first and second endless members to present a pair of lines of such first and second articles for transfer to said discharge zone, said advancing means being operable to maintain said lines stationary for a predetermined period of time, a movable transfer unit having conveyor means movable relative to said unit so that said conveyor means is stationary over a part of its path, said conveyor means while in the stationary part of its path cooperating with said line while stationary to unload said first and second articles in said discharge zone, and said carriage being movable by said first and second endless members while said second portion is advanced and while said second portion is stationary to compensate for the different rate of movement between the two portions of said first and second endless member.

10. Conveyor apparatus for transferring articles from first article handling means to second article handling means comprising a carriage reciprocable in first and second opposite directions, a conveyor member supported by said carriage and movable relative thereto, means connected to said member for moving a portion of said member and said carriage in said first direction to transfer articles from said first article handling means to a discharge zone and for thereafter maintaining said portion stationary with said transferred articles stationary in said discharge zone, a transfer unit connected to said member for transferring said articles while said portion is stationary from said discharge zone to said second article handling means, and means responsive to said transfer unit after it has transferred said articles from said discharge zone for moving said portion of said member toward said article supply means and correspondingly moving said carriage in said second direction.

11. A transfer conveyor for transferring articles from an article-supply zone to an article-discharge zone comprising a reciprocable carriage, article-transfer means cooperative with said supply zone to receive a line of articles therefrom and movable with respect to said carriage, means connected to said transfer means for advancing the portion only of said transfer means which has received said line of articles from said article-supply zone to said article discharge zone to present said line to said discharge zone, said advancing means stopping said transfer means at said discharge zone thereby stopping said line of articles for discharge at said discharge zone, said advancing means also moving said carriage to correspond to the movement of said portion, and means connected to said transfer means for returning said portion to said article supply zone after said articles have been discharged from said line and for correspondingly moving said carriage.

12. A transfer conveyor for transferring articles from an article-supply zone to an article discharge zone comprising a reciprocable carriage, article transfer means cooperative with said supply zone to receive articles therefrom and movable with respect to said carriage, means connected to said transfer means for advancing the portion only of said transfer means which has received said articles from said article-supply zone to said article discharge zone, said advancing means stopping said transfer means at said discharge zone thereby stopping said articles for discharge at said discharge zone, said advancing means also moving said carriage to correspond to the movement of said portion, and means connected to said transfer means and responsive to the discharge of all said articles in said portion for returning said portion to said article supply zone after said articles have been discharged from said portion and for correspondingly moving said carriage.

References Cited in the file of this patent
UNITED STATES PATENTS 2,932,376   Millington _____ Apr. 12, 1960